United States Patent [19]

Reitz et al.

[11] 4,245,083

[45] Jan. 13, 1981

[54] PHENOLIC FORMALDEHYDE-SALICYLIC ACID CONDENSATION PRODUCTS

[75] Inventors: Gunther Reitz, Cologne; Günther Boehmke, Leverkusen; Artur Haus, Overath; Martin Meister, Leverkusen, all of Fed. Rep. of Germany

[73] Assignee: Bayer Aktiengesellschaft, Leverkusen, Fed. Rep. of Germany

[21] Appl. No.: 941,979

[22] Filed: Sep. 13, 1978

[30] Foreign Application Priority Data

Sep. 15, 1977 [DE] Fed. Rep. of Germany ....... 2741484

[51] Int. Cl.$^3$ ................................................ C08G 8/18
[52] U.S. Cl. ............................ 528/148; 260/33.4 R; 525/501; 525/503; 525/508
[58] Field of Search ............... 528/148; 525/501, 503, 525/508

[56] References Cited

U.S. PATENT DOCUMENTS

| | | | |
|---|---|---|---|
| 1,826,094 | 10/1931 | Schuette | 528/148 X |
| 2,571,118 | 10/1951 | De Groote et al. | 528/148 |
| 2,907,719 | 10/1959 | Greenlee | 528/148 X |
| 2,907,750 | 10/1959 | Greenlee | 528/148 X |
| 2,981,710 | 4/1961 | Hoenel | 528/148 X |
| 3,296,181 | 1/1967 | Wurmli et al. | 528/148 X |
| 3,298,985 | 1/1967 | Bills et al. | 528/148 X |
| 3,624,038 | 11/1971 | Weidner | 528/148 X |
| 3,905,935 | 9/1975 | Irwin et al. | 528/148 X |
| 4,101,489 | 7/1978 | Reitz et al. | 260/29.3 |

FOREIGN PATENT DOCUMENTS

| | | | |
|---|---|---|---|
| 12021 | of 1928 | Australia | 528/148 |
| 290327 | 5/1928 | United Kingdom | 528/148 |
| 304454 | 7/1929 | United Kingdom | 528/148 |
| 194300 | 6/1967 | U.S.S.R. | 528/148 |

OTHER PUBLICATIONS

Chem. Abstracts, vol. 55, 1961, 5806i-5807a-c, Rabek et al., 1961.

*Primary Examiner*—Howard E. Schain
*Attorney, Agent, or Firm*—Sprung, Felfe, Horn, Lynch & Kramer

[57] ABSTRACT

Condensation products which are obtained by reaction of aromatic hydroxycarboxylic acids with formaldehyde in a first stage and by a subsequent condensation reaction of the products with phenol and/or phenol derivatives in the molar ratio 1:(0.8–21):(0.6–20) are suitable as fixing agents for basic dyestuffs in paper printing.

3 Claims, No Drawings

PHENOLIC FORMALDEHYDE-SALICYLIC ACID CONDENSATION PRODUCTS

The invention relates to condensation products of aromatic hydroxycarboxylic acids, formaldehyde and phenols, their preparation and their use as fixing agents for basic dyestuffs in paper printing.

The condensation products are characterised in that they are obtained by reaction of the aromatic hydroxycarboxylic acids with formaldehyde in a first stage and by a subsequent condensation reaction of the products with phenol and/or phenol derivatives in the molar ratio 1:(0.8"21):(0.6–20). The sum of the aromatic hydroxycarboxylic acid and phenol and/or phenol derivatives here is in the molar ratio to formaldehyde of 1:(0.5–1.0).

Particularly suitable fixing agents are obtained when the molar ratio of aromatic hydroxycarboxylic acid to formaldehyde to phenol and/or phenol derivatives is 1:(1,2–10):(1–10). In this case, the molar ratio of the sum of the carboxylic acid and phenol and/or phenol derivatives to formaldehyde is 1:(0.6–0.9).

Preferred aromatic hydroxycarboxylic acids are phenolcarboxylic acids, in particular salicylic acid.

Preferred phenols are phenol, cresol, bisphenol A or a condensation product of phenol and/or cresol and formaldehyde in the molar ratio of phenol/cresol to formaldehyde of 1:(0.5–0.8) or mixtures thereof.

The first reaction stage is carried out by bringing together the aromatic hydroxycarboxylic acid and the desired amount of 20 to 40% strength formaldehyde solution and heating the mixture. In this procedure, the mixture can be heated to the reflux temperature, under acid catalysis, or it is possible to carry out the reaction without or with only a little catalyst, under auto-catalysis by the hydroxycarboxylic acid, above the boiling point, for example at 103°–160° C., and under excess pressure.

Inorganic and organic acids, in particular mineral acids, for example hydrochloric acid, phosphoric acid and sulphuric acid, or formic acid can be used as the acid catalyst.

The acids used as catalysts are added in a molar ratio of 0.0001–0.5, preferably 0.001–0.1, relative to hydroxycarboxylic acid.

It has been shown that a reaction time of 30–180 minutes gives the best results. In the case of the reaction at the reflux temperature, soon after the reflux temperature has been reached it is observed that the solution becomes clear, and after about one hour it becomes opaline and more and more turbid with increasing condensation time.

Water-soluble products are obtained in this preliminary stage. These are probably aromatic hydroxycarboxylic acids substituted by a maximum of two hydroxymethyl groups, methylene-bis-(salicylic acid) and methylolated derivatives thereof.

The phenol and/or substituted phenol is then added dropwise to the precondensate thus prepared, whereupon significant heat killing can lead to vigorous reflux and indicates the much higher reactivity, compared with the hydroxycarboxylic acid. Pure phenol or a mixture of phenol and cresol in the ratio 1:(1 to 0) or a condensation product of phenol and/or cresol and formaldehyde in the molar ratio of phenol/cresol to formaldehyde of 1:(0,6–0,75) is preferably added. Still further formaldehyde solution can be added in order to bring the reaction to completion. The post-condensation reaction is carried out at temperatures of 80°–140° C., preferably at 90° C. to 130° C., over a period of 30 minutes to 15 hours, preferably of 1 to 4 hours.

The condensation product formed is a water-insoluble, highly viscous to plastic substance which is readily soluble in alcohols, such as ethanol, and draws threads under the influence of heat and solidifies in the cold.

The solubility in ethanol is up to 70%.

For the preparation of the fixing agent, the substance is dried. In addition, excess acid, for example sulphuric acid, can first be washed out. Remaining traces of phenolic compounds can be removed by steam distillation. Drying is carried out on drying trays or, even more simply, by distilling the excess water out of the reaction vessel, whereupon a mass which, under the influence of heat, is stirrable to solid, remains. If the mass can no longer be stirred, a few parts of ethylglycol are added and the residual water is distilled off.

The product can be employed as a powder, after grinding, or it is dissolved directly in ethyl alcohol to give a 40 to 70% strength solution.

The preparation of condensation products from aromatic hydroxycarboxylic acids, formaldehyde and certain phenols is known from German Patent specification No. 693,770 and German Patent Specification No. 714,819.

In these cases, the reaction is a simultaneous condensation reaction of two aromatic hydroxy compounds of comparable reactivity, which is greatly reduced compared with the unsubstituted phenol. The reduction in reactivity is a result of the substitution of these aromatic hydroxy compounds by electron-attracting substituents, for example by the COOH group, in the case of the aromatic hydroxycarboxylic acids, or by the $SO_2$ group (German Patent Specification No. 693,770) or by the Cl atom (German Patent Specification No. 714,819). Since the rate of reaction is of comparable order of magnitude in the case of all these compounds, during the simultaneous condensation reaction with formaldehyde they form co-condensates with an approximate equipartition of the individual components, according to the molar proportions.

However, this is not the case if it is desired to react an aromatic hydroxy compound of comparatively low reactivity, for example salicylic acid or a phenol substituted by a long-chain alkyl group, simultaneously with a compound of higher reactivity, for example phenol or cresol.

In this case, phenol/formaldehyde condensation products, which soon lead to insoluble products, are preferably formed, whilst a considerable proportion of the salicylic acid, for example, does not undergo a condensation reaction with the formaldehyde and the phenol and can be washed out.

The desired condensation products have now successfully been prepared from components with a different reactivity towards formaldehyde using the new process.

The new condensation products are used as fixing agents for cationic dyestuffs in printing inks, in particular in flexographic printing inks for paper, metal foils or plastic films.

Possible cation dyestuffs are dyestuffs of the most diverse classes of compounds, for example diphenylmethane dyestuffs, triphenylmethane dyestuffs and rhodamine dyestuffs, azo dyestuffs or anthraquinone dyestuffs containing onium groups, and furthermore thiazine dyestuffs, oxazine dyestuffs, methine dyestuffs and azomethine dyestuffs, such as are described, for example, in Ullmanns Encyclopädie der technischen Chemie (Ullmann's Encyclopaedia of Industrial Chemistry), 3rd edition, 1970, supplementary volume, page 225.

An excellent fastness of the prints to wet processing is achieved with the aid of the new condensation products. The condensation products are virtually odourless and are readily compatible with other customary constituents of printing inks, for example binders and acid fixing resins, such as are described in the Lacquer Raw Material Tables by Dr. E. Karsten (Curt R. Vincentz-Verlag, Hanover), and, as a result of their good solubility in alcohol, are suitable for the preparation of concentrated, marketable solutions.

They can be added to the known printing inks, suitable for this purpose, in the solid form or in the form of their alcoholic solutions. Their content in the printing ink depends here on the ease of fixing of the dyestuff used. In general, a dyestuff/fixing agent ratio of 1:0.5–3, preferably of 1:1–1.5, is employed.

The Colour Index numbers indicated in the Examples relate to the 3rd edition (1971).

EXAMPLE 1

69 g of salicylic acid, 120 g of 30% strength aqueous formaldehyde solution and 8 g of 50% strength sulphuric acid are put into a flask and the mixture is heated to the boil and stirred at 95° C. for 2 hours. A clear to opaline solution is formed. After cooling the mixture slightly, a mixture of 47 g of phenol and 54 g of cresol is added dropwise, whereupon the temperature rises to the boiling point. The post-condensation reaction is carried out at the boiling point for two hours, the mixture is washed with water and the residual water is distilled off. The residue is dissolved in ethyl alcohol to give a 60% strength solution.

EXAMPLE 2

69 g of salicylic acid, 120 g of 30% strength aqueous formaldehyde solution and 8 g of 50% strength sulphuric acid are heated to the boil and the mixture is further stirred under reflux for one hour. 94 g of phenol are then added dorpwise. The post-condensation reaction is carried out at the boiling point for two hours and the mixture is washed with water and dried. The product is ground to give a powder. It is soluble in alcohol to the extent of up to 70%.

EXAMPLE 3

69 g of salicylic acid, 55 g of 30% strength aqueous formaldehyde solution and 2 g of 50% strength sulphuric acid are brought together, the mixture is heated to the reflux temperature for 1 to 2 hours and, after cooling slightly, 60 g of bis-2,2-(4-hydroxyphenyl)-propane are added and the condensation reaction is further carried out at 80°–90° C. for two hours. After washing and drying, the product is powdered. The product is soluble in ethyl alcohol to the extent of 60%.

EXAMPLE 4

34.5 g of salicylic acid, 96.3 g of 37% strength aqueous formaldehyde solution and 8 g of 50% strength sulphuric acid are heated to 100° C. for 2 hours, a mixture of 47 g of phenol and 54 g of cresol is then added dropwise and the mixture is heated to 100° C. for a further 1.5 hours. After washing and drying, the product is powdered. The substance is soluble in ethyl alcohol to the extent of 60%.

EXAMPLE 5

18 g of salicylic acid and 90 g of 37% strength formaldehyde solution and 8 g of 50% strength sulphuric acid are stirred at 100° C. for 2 hours and a mixture of 54 g of cresol and 47 g of phenol is then allowed to run in. After a further hour at 100° C., the mixture is washed and then dried and powdered. The product is soluble in alcohol to the extent of 60%.

EXAMPLE 6

113 g of 30% strength HCHO, 4 g of 50% strength sulphuric acid and 69 g of salicylic acid are stirred at 100° C. for one hour and 94 g of phenol are then slowly added. The mixture is stirred at 100° C. for a further 3 hours, washed and dried and dissolved in alcohol to the extent of 60%.

EXAMPLE 7

103 g of salicyclic acid and 168 g of 30% strength aqueous formaldehyde solution as well as 200 mg of concentrated $H_2SO_4$ are subjected to a pre-condensation reaction at 110°–120° C. for 1.5 hours, a mixture of 70.5 g of phenol and 81 g of o-cresol is then added dropwise at 100° C. and the postcondensation reaction is carried out at 110°–120° C. for a further 2 hours. 1.5 kg of steam are then bubbled through the mixture, the residual water is distilled off and the product is dried. It is then dissolved in ethanol to the extent of a solids content of 60%.

EXAMPLE 8

6 g of ethylglycol and 10 g of the yellow dyestuff C.I. No. 41,000 are added to 25 g of the 60% strength solution of one of the Examples 1 to 7. Using a few milliliters of this solution, a thin layer of dyestuff is drawn over a waxing paper using a doctor blade. After drying, a moist filter paper is placed onto this layer of dyestuff, and on top of this is placed a glass plate weighted with a 1 kg weight. After 4 hours, the filter paper is removed and the amount of dyestuff transferred onto the filter paper is evaluated optically. An excellent fastness to wet processing is exhibited in all cases.

EXAMPLE 9

Prints with excellent water-resistance according to DIN 16,524, sheet 1, can be obtained on paper using the formulations a-c on flexographic printing machines, which are provided with infra-red or hot air drying units, at a printing speed of up to 400 m/minute.

a. 8 g of the yellow dyestuff C.I. 41,000, 8 g of a binder based on a ketone resin and 12 g of the powder obtained according to Example 1, are dissolved in 5 g of ethylglycol and 67 g of ethyl alcohol.

b. 60 g of the powder obtained according to Example 1 are dissolved in 10 g of ethylglycol and 30 g of ethyl alcohol at room temperature, whilst stirring. 34 g of this solution are added to 66 g of a solution of 10 g of the red dyestuff C.I. No. 42,520, 14 g of a maleate resin and 42 g of ethyl alcohol, whilst stirring.

c. 60 g of the powder obtained according to Example 1 are dissolved in 40 g of ethyl alcohol at 60° C. 17 g of this solution are added to 83 g of a solution of 10 g of the green dyestuff C.I. No. 42,040, 15 g of a colophony-modified phenolic resin with an acid number of 80–90 and 58 g of ethyl alcohol, whilst stirring.

We claim:

1. An alcohol-soluble condensation product of salicylic acid, formaldehyde and at least one phenolic material selected from the group consisting of phenol, cresol, bisphenol A, a 1:0.5–0.8 molar ratio condensation product of phenol and formaldehyde and a 1:0.5–0.8 molar ratio condensation product of cresol and formaldehyde, produced by reacting salicylic acid with formaldehyde in the presence of an acid catalyst in a first stage at a temperature from 100°–130° C. and then reacting the product under acidic conditions with the phenolic material at 80°–140° C., the molar ratio of salicylic acid:formaldehyde:phenolic material being 1:1.2–10:1–10 and the molar ratio of the sum of salicylic acid plus phenol, cresol and bisphenol-A:formaldehyde being 1:0.6–0.9.

2. A condensation product according to claim 1, in which the acid catalyst in sulphuric acid.

3. A process for the preparation of an alcohol-soluble condensation product of salicylic acid, formaldehyde and at least one phenolic material selected from the group consisting of phenol, cresol, bisphenol A, a 1:0.5–0.8 molar ratio condensation product of phenol and formaldehyde and a 1:05–0.8 molar ratio condensation product of cresol and formaldehyde, comprising reacting salicylic acid with formaldehyde in the presence of an acid catalyst in a first stage at a temperature from 100°–130° C. and then reacting the product under acidic conditions with the phenolic material at 80°–140° C., the molar ratio of salicylic acid:formaldehyde:phenolic material being 1:0.8–21:0.6–20 and the molar ratio of the sum of salicylic acid plus phenol, cresol and bisphenol-A:formaldehyde being 1:0.6–0.9.

* * * * *